United States Patent
Wu et al.

(10) Patent No.: US 9,367,892 B2
(45) Date of Patent: Jun. 14, 2016

(54) PROCESSING METHOD AND APPARATUS FOR SINGLE-CHANNEL CONVOLUTION LAYER, AND PROCESSING METHOD AND APPARATUS FOR MULTI-CHANNEL CONVOLUTION LAYER

(71) Applicant: Baidu Online Network Technology (Beijing) Co., Ltd., Beijing (CN)

(72) Inventors: Ren Wu, Beijing (CN); Shigang Li, Beijing (CN); Dalong Du, Beijing (CN); Wenzhi Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/579,787

(22) Filed: Dec. 22, 2014

(65) Prior Publication Data
US 2015/0371359 A1 Dec. 24, 2015

(30) Foreign Application Priority Data

Jun. 18, 2014 (CN) .......................... 2014 1 0274196

(51) Int. Cl.
| | | |
|---|---|---|
| G06K 9/64 | (2006.01) | |
| G06T 1/60 | (2006.01) | |
| G06K 9/00 | (2006.01) | |
| G06K 9/46 | (2006.01) | |
| G06T 5/20 | (2006.01) | |

(52) U.S. Cl.
CPC .............. G06T 1/60 (2013.01); G06K 9/00986 (2013.01); G06K 9/4642 (2013.01); G06T 5/20 (2013.01); *G06T 2207/20021* (2013.01); *G06T 2207/20024* (2013.01); *G06T 2207/20084* (2013.01); *G06T 2207/20182* (2013.01)

(58) Field of Classification Search
USPC .......................... 382/279, 276, 132, 118, 217; 235/462.09, 462.22, 462.23, 462.25, 235/472.01, 462.01; 250/370.09; 348/E5.086; 711/141, 135, 147, 148, 711/202; 712/34; 717/140, 146
See application file for complete search history.

(56) References Cited

U.S. PATENT DOCUMENTS

| | | | | |
|---|---|---|---|---|
| 7,086,595 B2 * | 8/2006 | Zhu | ..................... | G06K 7/10732 235/462.09 |
| 8,321,849 B2 * | 11/2012 | Nickolls | ................. | G06F 8/456 717/146 |

OTHER PUBLICATIONS

European Search Report and Written Opinion dated Feb. 25, 2016 for corresponding European Application No. 14200014.

(Continued)

*Primary Examiner* — Anh Do
(74) *Attorney, Agent, or Firm* — David D. Brush; Westman, Champlin & Koehler, P.A.

(57) ABSTRACT

A processing method and a processing apparatus for a single-channel convolution layer, and a processing method and apparatus for a multi-channel convolution layer are provided. The processing method for a single-channel convolution layer includes following steps. Data to be processed is divided into a plurality of data blocks, the plurality of data blocks are read by a plurality of graphic processor thread groups into local memories of the plurality of graphic processor thread groups, a plurality of filters are read by the plurality of graphic processor thread groups into the local memories of the plurality of graphic processor thread groups and convolutions of corresponding data points in the plurality of data blocks and the plurality of filters simultaneously are calculated by a plurality of threads in the plurality of graphic processor thread groups.

20 Claims, 6 Drawing Sheets

(56) References Cited

OTHER PUBLICATIONS

Victor Podlozhnyuk: "Image Convolution with CUDA" NVIDIA white paper, Jun. 1, 2007, pp. 1-21.

Ben Van Werkhoven et al., "Optimizing Convolution Operations in CUDA with Adaptive Tiling" 2nd Workshop on Applications for Multi and Many Core Processors, A4MMC '11, Jun. 4, 2011.

Ben Van Werkhoven et al., "Optimizing convolution operations on GPUs using adaptive tiling" Future Generations Computer Systems., vol. 30, Jan. 1, 2014, pp. 14-26.

Eric Battenberg et al. "Implementing Real-Time Partitioned Convolution Algorithms on Conventional Operating Systems", Proc. 14th Int. Conf. Digital Audio Effects, DAFx-11, Sep. 23, 2011, pp. 313-320.

V.K. Madisetti et al., "Chap. 8. Fast convolution and filterings" In: "The Digital Signal Processing Handbook", Dec. 22, 1999, CRC Press.

* cited by examiner

PROCESSING METHOD AND APPARATUS FOR SINGLE-CHANNEL CONVOLUTION LAYER, AND PROCESSING METHOD AND APPARATUS FOR MULTI-CHANNEL CONVOLUTION LAYER

CROSS REFERENCE TO RELATED APPLICATION

This application claims priority and benefits of Chinese Patent Application No. 201410274196.3, filed with State Intellectual Property Office on Jun. 18, 2014, the entire content of which is incorporated herein by reference.

FIELD

Embodiments of the present disclosure generally relate to an information processing technology field, and more particularly, to a processing method and a processing apparatus for a single-channel convolution layer, and a processing method and a processing apparatus for a multi-channel convolution layer.

BACKGROUND

The convolution neural network is widely used in various applications, especially in image and video applications. The convolution layer is an essential computation part in the convolution neural network. In the convolution layer, taking image as an example, plurality of filters act on the image respectively to calculate the convolution. In the related art, the convolution calculation is implemented in two modes as follows: (1) the filter act on the image directly to calculate the convolution, in which the graphic processor thread group is in a two-dimension (X and Y) mode, X dimension is divided by a number of all the images and Y dimension is divided by a number of all the filters, and each graphic processor thread calculates convolutions of the plurality of filters on a plurality of images, but only calculates the convolution kernel corresponding to one data point; (2) all image data is unfolded one data point by one data point according to the size of filter, such that the convolution calculation is transferred to a dense matrix multiplication.

However, there are following defects in the related art. In the first mode, input data points corresponding to adjacent output data points overlap with each other. For example, for a convolution kernel with a step length of 1 and a 5*5 filter, overlapped data between the input data points corresponding to adjacent output data points have a proportion of eighty percent, such that a large number of data is read into the local memory repeatedly, thus resulting in a poor performance. In the second mode, in order to store the image, it is unfolded first, and thus the needed memory space is in direct proportion to the size of convolution kernel. For example, a 5*5 filter needs 25 times additional memory, and a 9*9 filter needs 81 times additional memory. In a practical application, the filer may have a larger size and a global memory cost of the graphic processor is increased greatly.

SUMMARY

Embodiments of the present disclosure seek to solve at least one of the problems existing in the related art to at least some extent.

Accordingly, a first object of the present disclosure is to provide a processing method for a single-channel convolution layer, which makes good use of a memory space, increases a reuse of data in a local memory and improves a ratio of performance to power consumption.

A second object of the present disclosure is to provide an apparatus for processing method for a single-channel convolution layer.

A third object of the present disclosure is to provide a processing method for a multi-channel convolution layer.

A fourth object of the present disclosure is to provide a processing apparatus for a multi-channel convolution layer.

In order to achieve above objects, embodiments of a first aspect of the present disclosure provides a processing method for a single-channel convolution layer, including: dividing data to be processed into a plurality of data blocks; reading by a plurality of graphic processor thread groups the plurality of data blocks into local memories of the plurality of graphic processor thread groups; reading by the plurality of graphic processor thread groups a plurality of filters into the local memories of the plurality of graphic processor thread groups; and calculating by a plurality of threads in the plurality of graphic processor thread groups convolutions of corresponding data points in the plurality of data blocks and the plurality of filters simultaneously.

With the processing method for a single-channel convolution layer, there are following effects: (1) the convolution is calculated on the input data directly without unfolding the data one data point by one data point, and thus an additional memory is not needed and the memory space can be made good use of; (2) the graphic processor threads in a same graphic processor thread group calculate serial output data points and use serial input data points, which increases the reuse of data in the local memory, and the graphic processor threads store the data to be processed and convolution kernel data in the local memory of a high-speed graphic processor temporarily, which decreases a read number of the global memory of a low-speed graphic processor thread, thus resulting in a great performance, and the graphic processor threads further reduce a number of data movement, which decreases power consumption and increases a ratio of performance to power consumption; (3) during dividing the data into the plurality of data blocks, the memory access calculation ratio is reduced by using the register dividing method, although the register dividing method may also be used in the related art, it is difficult to take effect due to a data organization mode thereof.

In order to achieve above objects, embodiments of a second aspect of the present disclosure provide a processing apparatus for a single-channel convolution layer, including: a dividing module configured to divide data to be processed into a plurality of data blocks; a first reading module configured to read the plurality of data blocks into local memories of a plurality of graphic processor thread groups via the plurality of graphic processor thread groups; a second reading module configured to read a plurality of filters into the local memories of the plurality of graphic processor thread groups via the plurality of graphic processor thread groups; and a calculating module configured to calculate convolutions of corresponding data points in the plurality of data blocks and the plurality of filters via a plurality of threads in the plurality of graphic processor thread groups simultaneously.

With the processing apparatus for a single-channel convolution layer according to embodiments of the present disclosure, there are following effects: (1) the convolution is calculated on the input data directly without unfolding the data one data point by one data point, and thus an additional memory is not needed and the memory space can be made good use of; (2) the graphic processor threads in a same graphic processor thread group calculate serial output data points and use serial input data points, which increases the reuse of data in the local memory, and the graphic processor threads store the data to be processed and convolution kernel data in the local memory of a high-speed graphic processor temporarily, which decreases a read number of the global memory of a low-speed graphic processor thread, thus resulting in a great performance, and the graphic processor threads further reduce a number of data movement, which decreases the power consumption and increases a ratio of performance to power consumption; (3) during dividing the data into the plurality of data blocks, the memory access calculation ratio is reduced by using a register dividing method, although the register dividing method may also be used in the related art, it is difficult to take effect due to a data organization mode thereof.

In order to achieve above objects, embodiments of a third aspect of the present disclosure provide a processing method for a multi-channel convolution layer, including: dividing the data to be processed in each channel into a plurality of data blocks; reading by a plurality of graphic processor thread groups the plurality of data blocks into local memories of the plurality of graphic processor thread groups simultaneously; reading by the plurality of graphic processor thread groups a plurality of filters into the local memories of the plurality of graphic processor thread groups simultaneously; calculating by a plurality of threads in the plurality of graphic processor thread groups convolutions of corresponding data points in the plurality of data blocks and the plurality of filters in one channel simultaneously; calculating by the plurality of threads in the plurality of graphic processor thread groups the convolutions in each channel one by one to obtain a convolution result of each channel and accumulating the convolution result of each channel to obtain a final convolution result; writing the final convolution result into a global memory of the plurality of graphic processor thread groups.

With the processing method for a multi-channel convolution layer according to embodiments of the present disclosure, there are following effects: (1) the convolution is calculated on the input data directly without unfolding the data one data point by one data point, and thus an additional memory is not needed and the memory space can be made good use of; (2) the graphic processor threads in a same graphic processor thread group calculate serial output data points and use serial input data points, which increases the reuse of data in the local memory, and the graphic processor threads store the data to be processed and convolution kernel data in the local memory of a high-speed graphic processor temporarily, which decreases a read number of the global memory of a low-speed graphic processor thread, thus resulting in a great performance, and the graphic processor threads further reduce a number of data movement, which decreases the power consumption and increases a ratio of performance to power consumption; (3) during dividing the data into the plurality of data blocks, the memory access calculation ratio is reduced by using a register dividing method, although the register dividing method may also be used in the related art, it is difficult to take effect due to a data organization mode thereof.

In order to achieve objects, embodiments of a fourth aspect of the present disclosure provide a processing apparatus for a multi-channel convolution layer, including: a dividing module configured to divide the data to be processed in each channel into a plurality of data blocks; a first reading module configured to read the plurality of data blocks into local memories of a plurality of graphic processor thread groups by the plurality of graphic processor thread groups simultaneously; a second reading module configured to read a plurality of filters into the local memories of the plurality of graphic processor thread groups by the plurality of graphic processor thread groups simultaneously; a calculating module configured to calculate convolutions of corresponding data points in the plurality of data blocks and the plurality of filters in one channel via a plurality of threads in the plurality of graphic processor thread groups simultaneously; an accumulating module configured to calculate the convolutions in each channel one by one via the plurality of threads in the plurality of graphic processor thread groups to obtain a convolution result of each channel and to accumulate the convolution result of each channel to obtain a final convolution result; and a writing module configured to write the final convolution result into a global memory of the plurality of graphic processor thread groups.

With the processing apparatus for a multi-channel convolution layer according to embodiments of the present disclosure, there are following effects: (1) the convolution is calculated on the input data directly without unfolding the data one data point by one data point, and thus an additional memory is not needed and the memory space can be made good use of; (2) the graphic processor threads in a same graphic processor thread group calculate serial output data points and use serial input data points, which increases the reuse of data in the local memory, and the graphic processor threads store the data to be processed and convolution kernel data in the local memory of a high-speed graphic processor temporarily, which decreases a read number of the global memory of a low-speed graphic processor thread, thus resulting in a great performance, and the graphic processor threads further reduce a number of data movement, which decreases the power consumption and increases a ratio of performance to power consumption; (3) during dividing the data into the plurality of data blocks, the memory access calculation ratio is reduced by using a register dividing method, although the register dividing method may also be used in the related art, it is difficult to take effect due to a data organization mode thereof.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the description, terms such as "first" and "second" are used herein for purposes of description and are not intended to indicate or imply relative importance or significance. In addition, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art A method and a processing apparatus for a single-channel convolution layer, and a method and a processing apparatus for a multi-channel convolution layer according to embodiments of the present disclosure will be described with reference to drawings.

Figure 1:
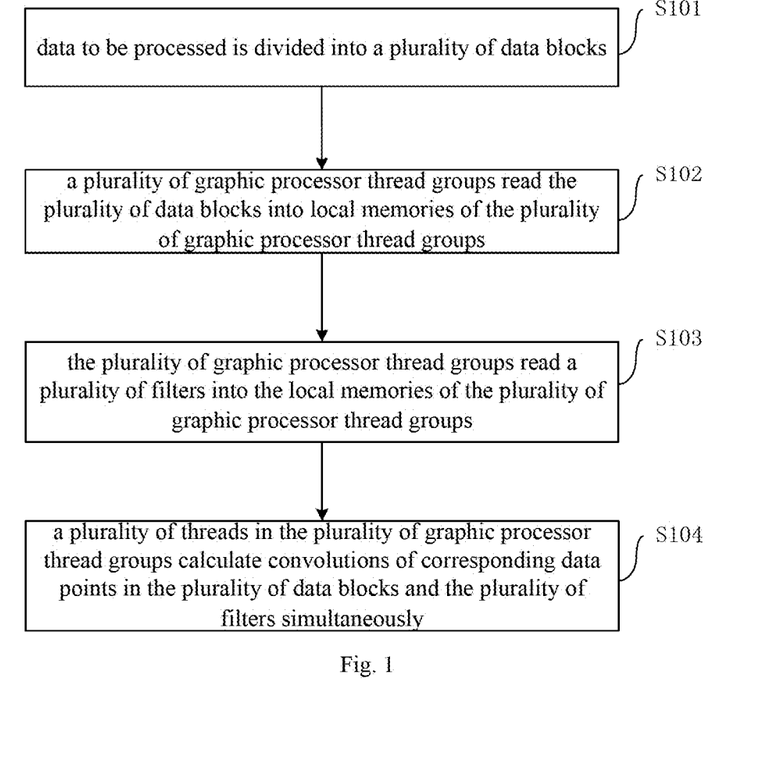
FIG. 1 is a flow chart of a processing method for a single-channel convolution layer according to an embodiment of the present disclosure.
Figure 2:
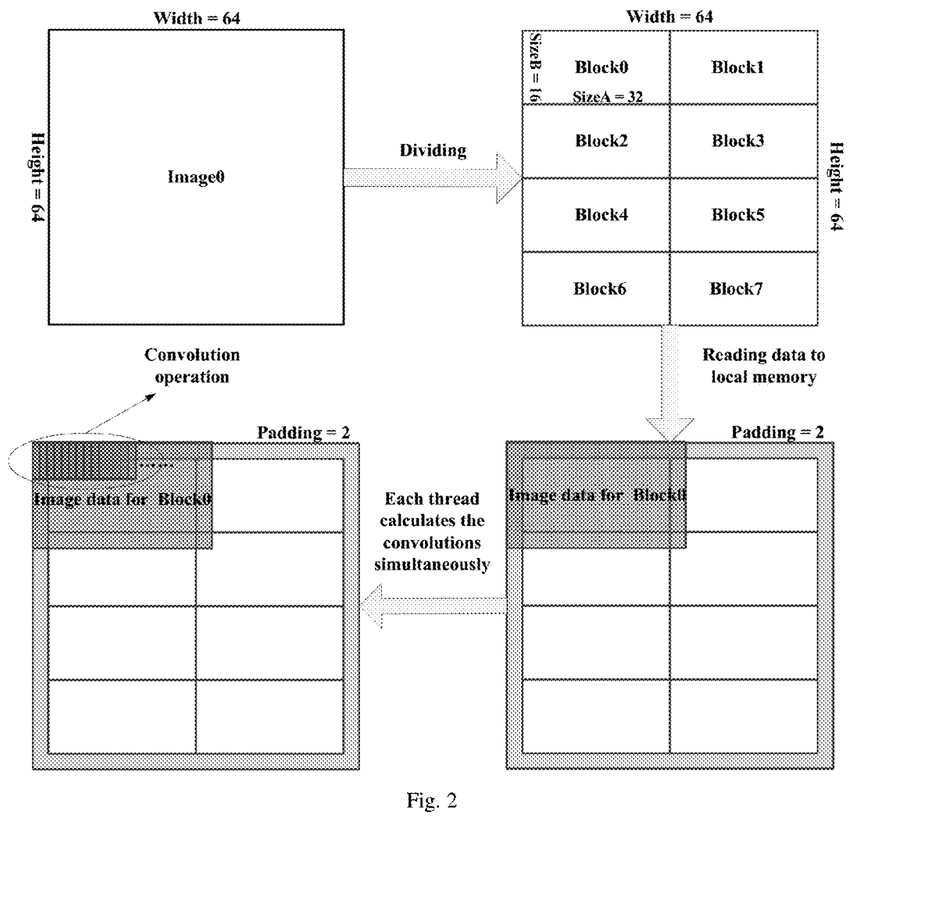
FIG. 2 is a schematic diagram of a processing method for a single-channel convolution layer according to an embodiment of the present disclosure.

FIG. 1 is a flow chart of a processing method for a single-channel convolution layer according to an embodiment of the present disclosure. FIG. 2 is a schematic diagram of a processing method for a single-channel convolution layer according to an embodiment of the present disclosure.

As shown in FIG. 1, the processing method for a single-channel convolution layer includes following steps.

At step S101, data to be processed is divided into a plurality of data blocks.

In an embodiment of the present disclosure, the data to be processed may be computer readable data such as image, video, audio and word. In some embodiments, taking an example of image data, an image may be divided into a plurality of data blocks according to a size of a graphic processor thread group and a size of the image, in which the graphic processor thread group includes a plurality of threads. For example, as shown in FIG. 2, if the size of the graphic processor thread group is 32*16 and the size of the image (i.e., image 0) is 64*64 (i.e., Width=64 and Height=64), the image may be divided into eight data blocks (i.e., Block 0 to Block 7) and a size of each data block is 32*16 (i.e., Size A=32 and Size B=16). Certainly, the image may not be divided averagely, as long as each graphic processor thread group can process the divided data blocks, which is not limited herein. It should be understood that, the embodiment shown in FIG. 2 is only exemplary, and the present disclosure may also be implemented by other embodiments and may also be applied in the other embodiments. Those skilled in the related art can make use of the embodiment in FIG. 2 to divide the data into the plurality of data blocks according to data of any size and a graphic processor thread group of any size and those extensions and variations of dividing the data into the plurality of data blocks shall be fallen into the protection scope of the present disclosure.

At step S102, a plurality of graphic processor thread groups read the plurality of data blocks into local memories of the plurality of graphic processor thread groups.

In an embodiment of the present disclosure, each graphic processor thread group reads a corresponding data block into the local memory of each graphic processor thread group respectively.

At step S103, the plurality of graphic processor thread groups read a plurality of filters into the local memories of the plurality of graphic processor thread groups.

In an embodiment of the present disclosure, each graphic processor thread group reads the plurality of filters into the local memory of each graphic processor thread group respectively.

In an embodiment of the present disclosure, step S103 may be executed before step S102, or step S102 and step S103 may be executed at a same time, which is not limited herein.

At step S104, a plurality of threads in the plurality of graphic processor thread groups calculate convolutions of corresponding data points in the plurality of data blocks and the plurality of filters simultaneously.

In an embodiment of the present disclosure, the data point is a unit data. Each graphic processor thread group stores the corresponding data block and the plurality of filters in the local memory of each graphic processor thread group, and the plurality of threads in each graphic processor thread group calculate the convolutions of the corresponding data points in the data block and the plurality of filters.

With the processing method for the single-channel convolution layer according to embodiments of the present disclosure, there are following effects: (1) the convolution is calculated on the input data directly without unfolding the data one data point by one data point, and thus an additional memory is not needed and the memory space can be made good use of (2) the graphic processor threads in a same graphic processor thread group calculate serial output data points and use serial input data points, which increases the reuse of data in the local memory, and the graphic processor threads store the data to be processed and convolution kernel data in the local memory of a high-speed graphic processor temporarily, which decreases a read number of the global memory of a low-speed graphic processor thread, thus resulting in a great performance, and the graphic processor threads further reduce a number of data movement, which decreases the power consumption and increases a ratio of performance to power consumption; (3) during dividing the data into the plurality of data blocks, the memory access calculation ratio is reduced by using a register dividing method, although the register dividing method may also be used in the related art, it is difficult to take effect due to a data organization mode thereof.

In an embodiment of the present disclosure, the plurality of data blocks are irregular data blocks. Certainly, the plurality of data blocks may be regular data blocks, which is not limited herein.

Figure 3:
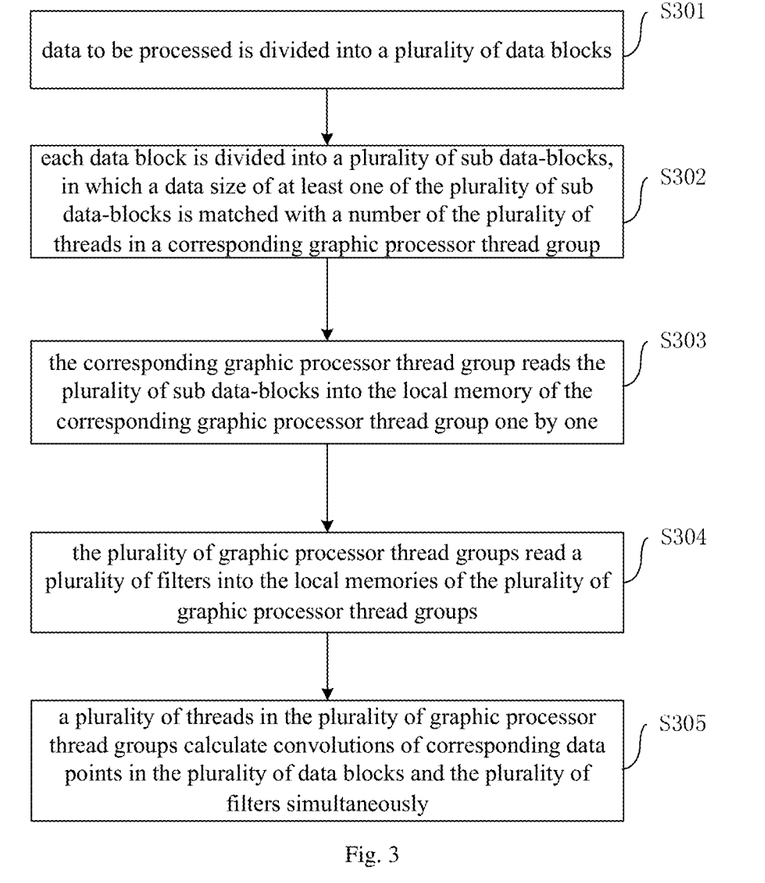
FIG. 3 is a flow chart of a processing method for a single-channel convolution layer according to another embodiment of the present disclosure.
Figure 4:
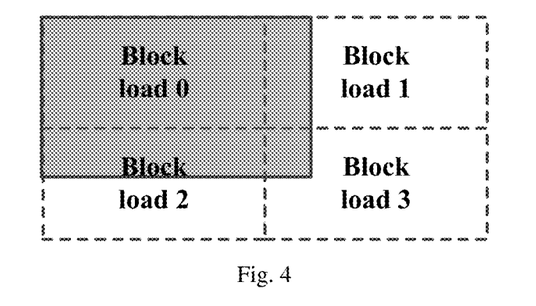
FIG. 4 is a schematic diagram of reading irregular data blocks according to an embodiment of the present disclosure.

FIG. 3 is a flow chart of a processing method for a single-channel convolution layer according to another embodiment of the present disclosure. FIG. 4 is a schematic diagram of reading irregular data blocks according to an embodiment of the present disclosure.

As shown in FIG. 3, the processing method for a single-channel convolution layer includes following steps.

At step S301, data to be processed is divided into a plurality of data blocks.

In an embodiment of the present disclosure, the data to be processed may be computer readable data such as image, video, audio and word. In some embodiments, taking an example of image data, an image may be divided into a plurality of data blocks according to a size of a graphic processor thread group and a size of the image, in which the graphic processor thread group includes a plurality of threads. For example, as shown in FIG. 2, if the size of the graphic processor thread group is 32*16 and the size of the image (i.e., image 0) is 64*64 (i.e., Width=64 and Height=64), the image may be divided into eight data blocks (i.e., Block 0 to Block 7) and a size of each data block is 32*16 (i.e., Size A=32 and Size B=16). Certainly, the image may not be divided averagely, as long as each graphic processor thread group can process the divided data blocks, which is not limited herein. It should be understood that, the embodiment shown in FIG. 2 is only exemplary, and the present disclosure may also be implemented by other embodiments and may also be applied in the other embodiments. Those skilled in the related art can make use of the embodiment in FIG. 2 to divide the data into the plurality of data blocks according to data of any size and a graphic processor thread group of any size, and those extensions and variations of dividing the data into the plurality of data blocks shall be fallen into the protection scope of the present disclosure.

At step S302, each data block is divided into a plurality of sub data-blocks, in which a data size of at least one of the plurality of sub data-blocks is matched with a number of the plurality of threads in a corresponding graphic processor thread group.

In an embodiment of the present disclosure, when a plurality of graphic processor thread groups read the plurality of data blocks into local memories of the plurality of graphic processor thread groups, padding data corresponding to the plurality of data blocks may be read into the local memories. Due to the padding data, the number of the data points in the data block is larger than the number of the plurality of threads in the graphic processor thread group. If a one to one mapping is to be established between the data points and the plurality of threads, a complex subscript operation will be brought in, thus increasing a data transmission delay. For reading irregular data, a simple the graphic processor thread group is used to map with irregular data blocks. In some embodiments, each data block is divided into the plurality of sub data-blocks, and the data size of the at least one of the plurality of sub data-blocks is matched with the number of the plurality of threads in the corresponding graphic processor thread group.

For example, as shown in FIG. 4, a data block is divided into four sub data-blocks such as Block load 0, Block load 1, Block load 2 and Block load 3.

At step S303, the corresponding graphic processor thread group reads the plurality of sub data-blocks into the local memory of the corresponding graphic processor thread group one by one.

In an embodiment of the present disclosure as shown in FIG. 4, a grey shaded area represents the data to be processed read by the corresponding graphic processor thread group at a first time. Then, the data in an area at a right side of the grey shaded area may be read and the rest may be read at twice subsequently. Thus, reading the data block is finished in four times. Although most of the threads are idle in first to third readings, the complex subscript operation is avoided.

At step S304, the plurality of graphic processor thread groups read a plurality of filters into the local memories of the plurality of graphic processor thread groups.

In an embodiment of the present disclosure, each graphic processor thread group reads the plurality of filters into the local memory of each graphic processor thread group respectively.

In an embodiment of the present disclosure, step S304 may be executed before step S302, or step S304 may be executed at a same time as step S302 and step S303, which is not limited herein.

At step S305, a plurality of threads in the plurality of graphic processor thread groups calculate convolutions of corresponding data points in the plurality of data blocks and the plurality of filters simultaneously.

In an embodiment of the present disclosure, the data point is a unit data. Each graphic processor thread group stores the corresponding data block and the plurality of filters in the local memory of each graphic processor thread group, and the plurality of threads in each graphic processor thread group calculate the convolutions of the corresponding data points in the data block and the plurality of filters.

With the method for processing single-channel convolution layer according to embodiments of the present disclosure, when the data block is read, each data block is divided into the plurality of sub data-blocks, in which the data size of at least one of the plurality of sub data-blocks is matched with the number of the plurality of threads in the corresponding graphic processor thread group, and then the corresponding graphic processor thread group reads the plurality of sub data-blocks into the local memory of the corresponding graphic processor thread group one by one. The method is quite applicable to read the irregular data blocks, such that the complex subscript operation can be avoided and the data transmission delay can be reduced.

In order to achieve above embodiments, a processing apparatus for a single-channel convolution layer is provided by embodiments of the present disclosure.

Figure 5:
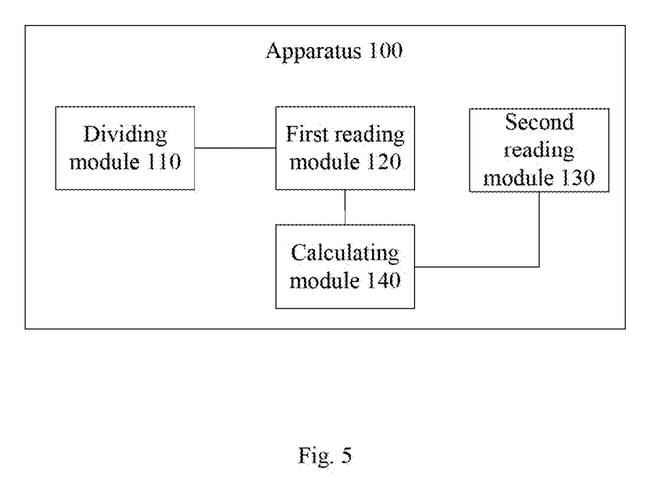
FIG. 5 is a block diagram of a processing apparatus for a single-channel convolution layer according to an embodiment of the present disclosure.

FIG. 5 is a block diagram of a processing apparatus for a single-channel convolution layer according to an embodiment of the present disclosure.

As shown in FIG. 5, the apparatus 100 includes: a dividing module 110, a first reading module 120, a second reading module 130 and a calculating module 140.

The dividing module 110 is configured to divide data to be processed into a plurality of data blocks. In some embodiments, the data to be processed may be computer readable data such as image, video, audio and word. In some embodiments, taking an example of image data, the dividing module 110 may divide an image into a plurality of data blocks according to a size of a graphic processor thread group and a size of the image, in which the graphic processor thread group includes a plurality of threads. For example, as shown in FIG. 2, if the size of the graphic processor thread group is 32*16 and the size of the image (i.e., image 0) is 64*64 (i.e., Width=64 and Height=64), the image may be divided into eight data blocks (i.e., Block 0 to Block 7) and a size of each data block is 32*16 (i.e., Size A=32 and Size B=16). Certainly, the image may not be divided averagely, as long as each graphic processor thread group can process the divided data blocks, which is not limited herein. It should be understood that, the embodiment shown in FIG. 2 is only exemplary, and the present disclosure may also be implemented by other embodiments and may also be applied in the other embodiments. Those skilled in the related art can make use of the embodiment in FIG. 2 to divide the data into the plurality of data blocks according to data of any size and a graphic processor thread group of any size, and those extensions and variations of dividing the data into the plurality of data blocks shall be fallen into the protection scope of the present disclosure.

The first reading module 120 is configured to read the plurality of data blocks into local memories of a plurality of graphic processor thread groups via the plurality of graphic processor thread groups. In some embodiments, each graphic processor thread group reads a corresponding data block into the local memory of each graphic processor thread group respectively.

The second reading module 130 is configured to read a plurality of filters into the local memories of the plurality of graphic processor thread groups via the plurality of graphic processor thread groups. In some embodiments, each graphic processor thread group reads the plurality of filters into the local memory of each graphic processor thread group respectively.

The calculating module 140 is configured to calculate convolutions of corresponding data points in the plurality of data blocks and the plurality of filters via a plurality of threads in the plurality of graphic processor thread groups simultaneously. In an embodiment of the present disclosure, the data point is a unit data. Each graphic processor thread group stores the corresponding data block and the plurality of filters in the local memory of each graphic processor thread group, and the plurality of threads in each graphic processor thread group calculate the convolutions of the corresponding data points in the data block and the plurality of filters.

With the processing apparatus for the single-channel convolution layer according to embodiments of the present disclosure, there are following effects: (1) the convolution is calculated on the input data directly without unfolding the data one data point by one data point, and thus an additional memory is not needed and the memory space can be made good use of: (2) the graphic processor threads in a same graphic processor thread group calculate serial output data points and use serial input data points, which increases the reuse of data in the local memory, and the graphic processor threads store the data to be processed and convolution kernel data in the local memory of a high-speed graphic processor temporarily, which decreases a read number of the global memory of a low-speed graphic processor thread, thus resulting in a great performance, and the graphic processor threads further reduce a number of data movement, which decreases the power consumption and increases a ratio of performance to power consumption; (3) during dividing the data into the plurality of data blocks, the memory access calculation ratio is reduced by using a register dividing method, although the register dividing method may also be used in the related art, it is difficult to take effect due to a data organization mode thereof.

In an embodiment of the present disclosure, the plurality of data blocks are irregular data blocks. Certainly, the plurality of data blocks may be regular data blocks, which is not limited herein.

Figure 6:
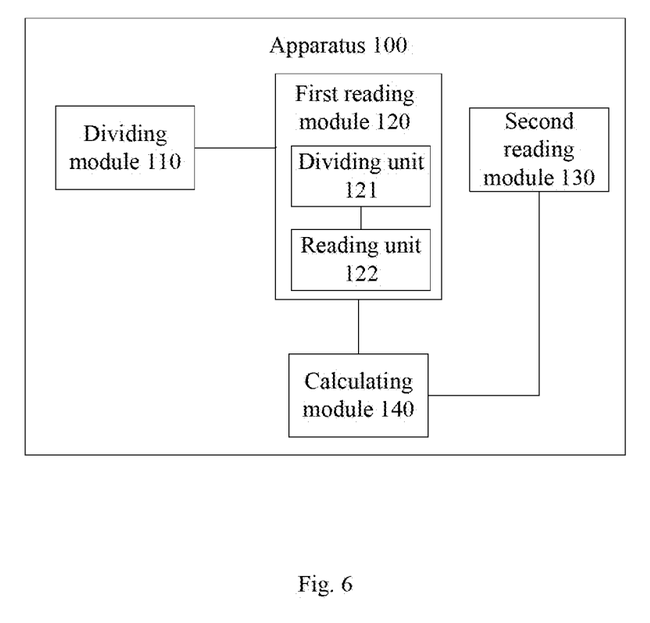
FIG. 6 is a block diagram of a processing apparatus for a single-channel convolution layer according to another embodiment of the present disclosure.

FIG. 6 is a block diagram of a processing apparatus for a single-channel convolution layer according to an embodiment of the present disclosure.

As shown in FIG. 6, the apparatus 100 includes: a dividing module 110, a first reading module 120, a second reading module 130 and a calculating module 140, in which the first reading module includes a dividing unit 121 and a reading unit 122.

In some embodiments, the dividing unit 121 is configured to divide each data block into a plurality of sub data-blocks, in which a data size of at least one of the plurality of sub data-blocks is matched with a number of the plurality of threads in a corresponding graphic processor thread group.

In an embodiment of the present disclosure, when a plurality of graphic processor thread groups read the plurality of data blocks into local memories of the plurality of graphic processor thread groups, the first reading module is further configured to read padding data corresponding to the plurality of data blocks into the local memories. Due to the padding data, a number of the data points in the data block is larger than the number of the plurality of threads in the graphic processor thread group. If a one to one mapping is to be established between the data points and the plurality of threads, a complex subscript operation will be brought in, thus increasing a data transmission delay. For reading irregular data, a simple the graphic processor thread group is used to map with irregular data blocks. In some embodiments, each data block is divided into the plurality of sub data-blocks, and the data size of the at least one of the plurality of sub data-blocks is matched with the number of the plurality of threads in the corresponding graphic processor thread group.

For example, as shown in FIG. 4, a data block is divided into four sub data-blocks such as Block load 0, Block load 1, Block load 2 and Block load 3.

The reading unit 121 is configured to read the plurality of sub data-blocks into the local memory of the corresponding graphic processor thread group one by one via the corresponding graphic processor thread group. In an embodiment of the present disclosure as shown in FIG. 4, a grey shaded area represents the data to be processed read by the corresponding graphic processor thread group at a first time. Then, the data in an area at a right side of the grey shaded area may be read and the rest may be read at twice subsequently. Thus, reading the data block is finished in four times. Although most of the threads are idle in first to third readings, the complex subscript operation is avoided.

With the processing apparatus for the single-channel convolution layer, when the data block is read, each data block is divided into the plurality of sub data-blocks, in which the data size of at least one of the plurality of sub data-blocks is matched with the number of the plurality of threads in the corresponding graphic processor thread group, and then the corresponding graphic processor thread group reads the plurality of sub data-blocks into the local memory of the corresponding graphic processor thread group one by one. The method is quite applicable to read the irregular data blocks, such that the complex subscript operation can be avoided and the data transmission delay can be reduced.

Embodiments of the present disclosure provide a method for processing multi-channel convolution layer.

Figure 7:
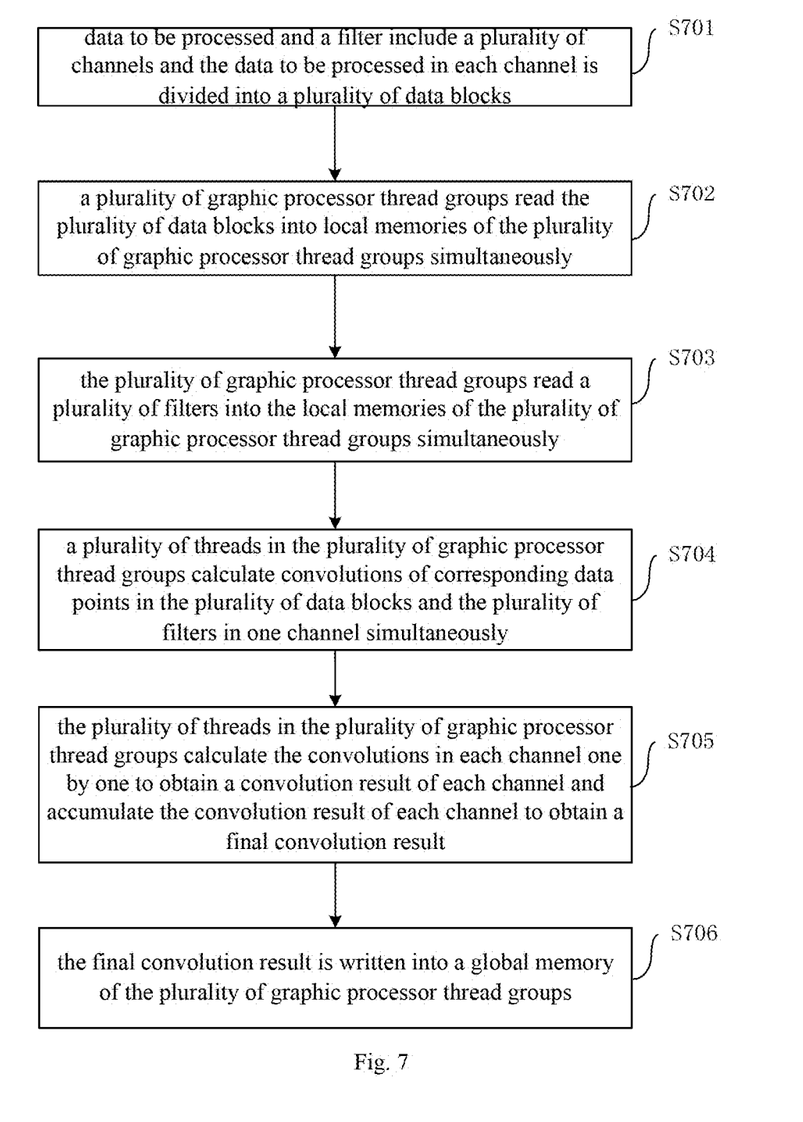
FIG. 7 is a flow chart of a processing method for a multi-channel convolution layer according to an embodiment of the present disclosure.

FIG. 7 is a flow chart of a processing method for a multi-channel convolution layer according to an embodiment of the present disclosure.

As shown in FIG. 7, the processing method for a multi-channel convolution layer includes following steps.

At step S701, data to be processed and a filter include a plurality of channels and the data to be processed in each channel is divided into a plurality of data blocks.

Figure 8:
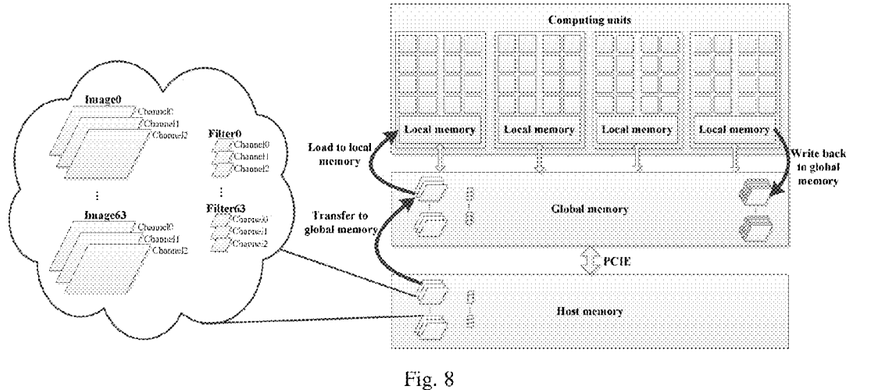
FIG. 8 is a schematic diagram of a processing method for a multi-channel convolution layer according to an embodiment of the present disclosure.

In some embodiments, the data to be processed may be computer readable data such as image, video, audio and word. In an embodiment of the present disclosure, taking an example of image data, input data to be processed (the data to be processed) in the multi-channel convolution layer includes a plurality of images and a plurality of filters, and each image and each filter includes a plurality of channels. As shown in FIG. 8, the input image include sixty-four images (i.e., Image 0 to Image 63) and sixty-four filters (i.e., Filter 0 to Filter 63), and each image has three channels (Channel 10, Channel 11 and Channel 12) and each filer has three channels (Channel 10, Channel 11 and Channel 12). It should be understood that, the embodiment in FIG. 8 is only exemplary, and the present disclosure may also be implemented by other embodiments and may also be applied in the other embodiments. Those skilled in the related art can process any amount of data and filters having any amount of channels according to the embodiment in FIG. 8.

In addition, a method for dividing the data to be processed in each channel into the plurality of data blocks may refer to that in the processing method for the single-channel convolution layer provided by above embodiments of the present disclosure and is omitted herein.

At step S702, a plurality of graphic processor thread groups read the plurality of data blocks into local memories of the plurality of graphic processor thread groups simultaneously.

At step S703, the plurality of graphic processor thread groups read a plurality of filters into the local memories of the plurality of graphic processor thread groups simultaneously.

In an embodiment of the present disclosure, taking an example of image data, before the plurality of graphic processor thread groups read the plurality of data blocks into local memories of the plurality of graphic processor thread groups simultaneously, the plurality of images and the plurality of filters are read into a global memory of the graphic processor. Alternatively, the plurality of images and the plurality of filters are stored in a central processing unit (CPU) memory (i.e., Host memory). Firstly, the plurality of images and the plurality of filters are transferred to the global memory of graphic processor from the CPU memory via a peripheral component interface express (PCIE), and then the plurality of threads in each computing unit of the graphic processor cooperate to load the plurality of images and the plurality of filters to the local memory from the global memory.

In an embodiment of the present disclosure, step S703 may be executed before step S702, or step S702 and step S703 may be executed at a same time, which is not limited herein.

At step S704, a plurality of threads in the plurality of graphic processor thread groups calculate convolutions of corresponding data points in the plurality of data blocks and the plurality of filters in one channel simultaneously.

In an embodiment of the present disclosure, the data point is a unit data. Each computing unit in the graphic processor includes the graphic processor thread group, and each thread in each computing unit calculates the convolutions of the data to be processed and the filters in the local memory. For example, the corresponding thread calculates the convolutions of the corresponding data points in the plurality of data blocks and the plurality of filters in Channel 10, in which each data point is convoluted with the plurality of filters in Channel 10.

At step S705, the plurality of threads in the plurality of graphic processor thread groups calculate the convolutions in each channel one by one to obtain a convolution result of each channel and accumulate the convolution result of each channel to obtain a final convolution result.

At step S706, the final convolution result is written into a global memory of the plurality of graphic processor thread groups.

As shown in FIG. 8, the final convolution result is written back to the global memory With the processing method for the multi-channel convolution layer according to embodiments of the present disclosure, there are following effects: (1) the convolution is calculated on the input data directly without unfolding the data one data point by one data point, and thus an additional memory is not needed and the memory space can be made good use of; (2) the graphic processor threads in a same graphic processor thread group calculate serial output data points and use serial input data points, which increases the reuse of data in the local memory, and the graphic processor threads store the data to be processed and convolution kernel data in the local memory of a high-speed graphic processor temporarily, which decreases a read number of the global memory of a low-speed graphic processor thread, thus resulting in a great performance, and the graphic processor threads further reduce a number of data movement, which decreases the power consumption and increases a ratio of performance to power consumption; (3) during dividing the data into the plurality of data blocks, the memory access calculation ratio is reduced by using a register dividing method, although the register dividing method may also be used in the related art, it is difficult to take effect due to a data organization mode thereof.

In an embodiment of the present disclosure, when the plurality of graphic processor thread groups read the plurality of data blocks into local memories of the plurality of graphic processor thread groups simultaneously, padding data corresponding to the plurality of data blocks may be read into the local memories. The plurality of padded data blocks are irregular data blocks. Certainly, the plurality of data blocks may also be regular data blocks, which is not limited herein.

Due to the padding data, a number of the data points in the data block is larger than the number of the plurality of threads in the graphic processor thread group. If a one to one mapping is to be established between the data points and the plurality of threads, a complex subscript operation will be brought in, thus increasing a data transmission delay. For reading irregular data, a simple the graphic processor thread group is used to map with irregular data blocks. In some embodiments, step S702 further includes following steps: each data block is divided into the plurality of sub data-blocks, in which the data size of the at least one of the plurality of sub data-blocks is matched with the number of the plurality of threads in the corresponding graphic processor thread group; and the corresponding graphic processor thread group read the plurality of sub data-blocks into the local memory of the corresponding graphic processor thread group one by one. These steps are similar to those in the processing method for a single-channel convolution layer described in above embodiments and are omitted herein. Therefore, a complex subscript operation is avoided and a data transmission delay is reduced.

In an embodiment of the present disclosure, calculating by the plurality of threads in the plurality of graphic processor thread groups convolutions of corresponding data points in the plurality of data blocks and the plurality of filters in one channel simultaneously includes: performing a register division processing on the convolutions of corresponding data points in the plurality of data blocks and the plurality of filters.

In order to achieve above embodiments of the present disclosure, a processing apparatus for a multi-channel convolution layer is provided by embodiments of the present disclosure.

Figure 9:
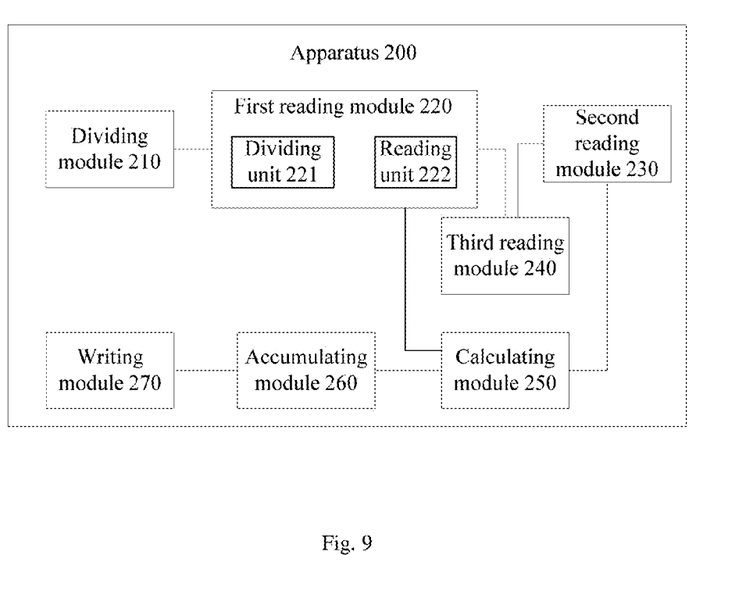
FIG. 9 is a block diagram of a processing apparatus for a multi-channel convolution layer according to an embodiment of the present disclosure.

FIG. 9 is a block diagram of a processing apparatus for a multi-channel convolution layer according to an embodiment of the present disclosure.

As shown in FIG. 9, the apparatus 200 includes: a dividing module 210, a first reading module 220, a second reading module 230, a third reading module 240, a calculating module 250, an accumulating module 260 and a writing module 270.

In some embodiments, the data to be processed may be computer readable data such as image, video, audio and word. In an embodiment of the present disclosure, taking an example of image data, the data to be processed and the filter have a plurality of channels, i.e., input data (the data to be processed) to be processed in the multi-channel convolution layer includes a plurality of images and a plurality of filters, and each image and each filter includes a plurality of channels. As shown in FIG. 8, the input image include sixty-four images (i.e., Image 0 to Image 63) and sixty-four filters (i.e., Filter 0 to Filter 63), and each image has three channels (Channel 10, Channel 11 and Channel 12) and each filer has three channels (Channel 10, Channel 11 and Channel 12). It should be understood that, the embodiment in FIG. 8 is only exemplary, and the present disclosure may also be implemented by other embodiments and may also be applied in the other embodiments. Those skilled in the related art can process any amount of data and filters having any amount of channels according to the embodiment in FIG. 8.

The dividing module 210 is configured to divide the data to be processed in each channel into a plurality of data blocks, which may refer to that in the processing method for the single-channel convolution layer described in above embodiments.

The first reading module 220 is configured to read the plurality of data blocks into local memories of a plurality of graphic processor thread groups by the plurality of graphic processor thread groups simultaneously. The second reading module 230 is configured to read a plurality of filters into the local memories of the plurality of graphic processor thread groups by the plurality of graphic processor thread groups simultaneously.

In an embodiment of the present disclosure, taking an example of image data, before the plurality of graphic processor thread groups read the plurality of data blocks into local memories of the plurality of graphic processor thread groups simultaneously, the third reading module 240 reads the plurality of images and the plurality of filters into a global memory of the graphic processor. Alternatively, the plurality of images and the plurality of filters are stored in a central processing unit (CPU) memory (i.e., Host memory). Firstly, the third reading module 240 transfers the plurality of images and the plurality of filters to the global memory of graphic processor from the CPU memory via a peripheral component interface express (PCIE), and then the plurality of threads in each computing unit of the graphic processor cooperate to load the plurality of images and the plurality of filters to the local memory from the global memory, i.e., via the first reading module 220 and the second reading module 230.

The calculating module 250 is configured to calculate convolutions of corresponding data points in the plurality of data blocks and the plurality of filters in one channel via a plurality of threads in the plurality of graphic processor thread groups simultaneously. In an embodiment of the present disclosure, the data point is a unit data. Each computing unit in the graphic processor includes the graphic processor thread group, and each thread in each computing unit calculates the convolutions of the data to be processed and the filters in the local memory. For example, the corresponding thread calculates the convolutions of the corresponding data points in the plurality of data blocks and the plurality of filters in Channel 10.

The accumulating module 260 is configured to calculate the convolutions in each channel one by one via the plurality of threads in the plurality of graphic processor thread groups to obtain a convolution result of each channel and to accumulate the convolution result of each channel to obtain a final convolution result. The writing module 270 is configured to write the final convolution result into a global memory of the plurality of graphic processor thread groups.

With the processing apparatus for the multi-channel convolution layer according to embodiment of the present disclosure, there are following effects: (1) the convolution is calculated on the input data directly without unfolding the data one data point by one data point, and thus an additional memory is not needed and the memory space can be made good use of; (2) the graphic processor threads in a same graphic processor thread group calculate serial output data points and use serial input data points, which increases the reuse of data in the local memory, and the graphic processor threads store the data to be processed and convolution kernel data in the local memory of a high-speed graphic processor temporarily, which decreases a read number of the global memory of a low-speed graphic processor thread, thus resulting in a great performance, and the graphic processor threads further reduce a number of data movement, which decreases the power consumption and increases a ratio of performance to power consumption; (3) during dividing the data into the plurality of data blocks, the memory access calculation ratio is reduced by using a register dividing method, although the register dividing method may also be used in the related art, it is difficult to take effect due to a data organization mode thereof.

In an embodiment of the present disclosure, when the plurality of graphic processor thread groups read the plurality of data blocks into local memories of the plurality of graphic processor thread groups simultaneously, the first reading module 220 is further configured to read padding data corresponding to the plurality of data blocks into the local memories. The plurality of padded data blocks are irregular data blocks. Certainly, the plurality of data blocks may also be regular data blocks, which is not limited herein.

Due to the padding data, a number of the data points in the data block is larger than the number of the plurality of threads in the graphic processor thread group. If a one to one mapping is to be established between the data points and the plurality of threads, a complex subscript operation will be brought in, thus increasing a data transmission delay. For reading irregular data, a simple the graphic processor thread group is used to map with irregular data blocks. In some embodiments, the first reading module 220 includes a dividing unit 221 and a reading module 222. The dividing unit 221 is configured to divide each data block into the plurality of sub data-blocks, in which a data size of the at least one of the plurality of sub data-blocks is matched with the number of the plurality of threads in the corresponding graphic processor thread group, and the reading unit 222 is configured to read the plurality of sub data-blocks into the local memory of the corresponding graphic processor thread group one by one via the corresponding graphic processor thread group, which are similar to those in the processing apparatus for a single-channel convolution layer described in above embodiments and are omitted herein. Therefore, a complex subscript operation is avoided and a data transmission delay is reduced.

In an embodiment of the present disclosure, the calculating module 250 is further configured to perform a register division processing on the convolutions of corresponding data points in the plurality of data blocks and the plurality of filters.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A processing method, implemented by a graphic processor, for a single-channel convolution layer, comprising:
    dividing at least one of image, video, or audio data to be processed into a plurality of data blocks;
    reading, by a plurality of graphic processor thread groups executed by the graphic processor, the plurality of data blocks into local non-transitory memories of the plurality of graphic processor thread groups associated the graphic processor;
    reading, by the plurality of graphic processor thread groups, a plurality of filters into the local memories of the plurality of graphic processor thread groups; and
    calculating, by a plurality of threads in the plurality of graphic processor thread groups, convolutions of corresponding data points in the plurality of data blocks and the plurality of filters simultaneously; and
    writing the convolutions into a global non-transitory memory associated with the graphic processor.

2. The method according to claim 1, wherein the plurality of data blocks are irregular data blocks.

3. The method according to claim 1, wherein reading by a plurality of graphic processor thread groups the plurality of data blocks into a local memory of the plurality of graphic processor thread groups comprises:
    dividing each data block into a plurality of sub data-blocks, in which a data size of at least one of the plurality of sub data-blocks is matched with a number of the plurality of threads in a corresponding graphic processor thread group; and
    reading by the corresponding graphic processor thread group the plurality of sub data-blocks into the local memory of the corresponding graphic processor thread group one by one.

4. The method according to claim 1, further comprising reading padding data corresponding to the plurality of data blocks into the local memories.

5. The method according to claim 1, further comprising receiving the image, video, or audio data by the global memory of the graphic processor prior to the dividing of the data, wherein the data is received from a central processing unit memory of a device hosting the graphic processor.

6. A non-transitory computer readable medium, comprising:
    instructions executable by a processor to divide data to be processed into a plurality of data blocks, the data corresponding to at least one of image, video, or audio data;
    instruction executable by a processor to read the plurality of data blocks into local memories of a plurality of graphic processor thread groups via the plurality of graphic processor thread groups;
    instructions executable by a processor to read a plurality of filters into the local memories of the plurality of graphic processor thread groups via the plurality of graphic processor thread groups; and
    instructions executable by a processor to calculate convolutions of corresponding data points in the plurality of data blocks and the plurality of filters via a plurality of threads in the plurality of graphic processor thread groups simultaneously.

7. The non-transitory computer readable medium according to claim 6, wherein the plurality of data blocks are irregular data blocks.

8. The non-transitory computer readable medium according to claim 6, further comprising:
    instructions executable by a processor
    to divide each data block into a plurality of sub data-blocks, in which a data size of at least one of the plurality of sub data-blocks is matched with a number of the plurality of threads in a corresponding graphic processor thread group; and
    instructions executable by a processor to read the plurality of sub data-blocks into the local memory of the corresponding graphic processor thread group via the corresponding graphic processor thread group one by one.

9. The non-transitory computer readable medium according to claim 6, further comprising instructions executable by a processor to read padding data corresponding to the plurality of data blocks into the local memories.

10. A processing method, implemented by a graphic processor, for a multi-channel convolution layer, wherein at least one of image, video, or audio data to be processed and a filter comprise a plurality of channels, the method comprising:
    dividing the data to be processed in each channel into a plurality of data blocks;
    reading, by a plurality of graphic processor thread groups executed by the graphic processor, the plurality of data blocks into local memories of the plurality of graphic processor thread groups simultaneously, wherein the local memories of the plurality of graphic processor thread groups are associated with the graphic processor;
    reading, by the plurality of graphic processor thread groups, a plurality of filters into the local memories of the plurality of graphic processor thread groups simultaneously;
    calculating, by a plurality of threads in the plurality of graphic processor thread groups, convolutions of corresponding data points in the plurality of data blocks and the plurality of filters in one channel simultaneously;
    calculating, by the plurality of threads in the plurality of graphic processor thread groups, the convolutions in each channel one by one to obtain a convolution result of each channel and accumulating the convolution result of each channel to obtain a final convolution result; and writing the final convolution result into a global memory of the plurality of graphic processor thread groups associated with the graphic processor.

11. The method according to claim 10, further comprising: reading padding data corresponding to the plurality of data blocks into the local memories, in which the plurality of padded data blocks are irregular data blocks.

12. The method according to claim 11, wherein the data to be processed is image data, the method further comprises:

reading a plurality of images and the plurality of filters into the global memory of the plurality of graphic processor thread groups.

13. The method according to claim 10, wherein reading by a plurality of graphic processor thread groups the plurality of data blocks into local memories of the plurality of graphic processor thread groups simultaneously comprises:

dividing each data block into a plurality of sub data-blocks, in which a data size of at least one of the plurality of sub data-blocks is matched with a number of a plurality of threads in a corresponding graphic processor thread group; and reading by the corresponding graphic processor thread group the plurality of sub data-blocks into the local memory of the corresponding graphic processor thread group one by one.

14. The method according to claim 10, wherein calculating by a plurality of threads in the plurality of graphic processor thread groups convolutions of corresponding data points in the plurality of data blocks and the plurality of filters in one channel simultaneously comprises:

performing a register division processing on the convolutions of corresponding data points in the plurality of data blocks and the plurality of filters.

15. The method according to claim 10, further comprising receiving the image, video, or audio data by the global memory of the graphic processor prior to the dividing of the data, wherein the data is received from a central processing unit memory of a device hosting the graphic processor.

16. A non-transitory computer readable medium, comprising:

instructions executable by a processor to divide the data to be processed in each channel into a plurality of data blocks, the data corresponding to at least one of image, video, or audio data;

instructions executable by a processor to read the plurality of data blocks into local memories of a plurality of graphic processor thread groups by the plurality of graphic processor thread groups simultaneously;

instructions executable by a processor to read a plurality of filters into the local memories of the plurality of graphic processor thread groups by the plurality of graphic processor thread groups simultaneously;

instructions executable by a processor to calculate convolutions of corresponding data points in the plurality of data blocks and the plurality of filters in one channel via a plurality of threads in the plurality of graphic processor thread groups simultaneously;

instructions executable a processor to calculate the convolutions in each channel one by one via the plurality of threads in the plurality of graphic processor thread groups to obtain a convolution result of each channel and to accumulate the convolution result of each channel to obtain a final convolution result; and instructions executable by a processor to write the final convolution result into a global memory of the plurality of graphic processor thread groups.

17. The non-transitory computer readable medium according to claim 16, further comprising instructions executable by a processor to read padding data corresponding to the plurality of data blocks into the local memories, in which the plurality of padded data blocks are irregular data blocks.

18. The non-transitory computer readable medium according to claim 17, wherein the data to be processed is image data, and the medium further comprises instructions executable by a processor to read a plurality of images and the plurality of filters into the global memory of the plurality of graphic processor thread groups.

19. The non-transitory computer readable medium according to claim 16, further comprising:

instructions executable by a processor to divide each data block into a plurality of sub data-blocks, in which a data size of at least one of the plurality of sub data-blocks is matched with a number of the plurality of threads in a corresponding graphic processor thread group; and instructions executable by a processor to read the plurality of sub data-blocks into the local memory of the corresponding graphic processor thread group via the corresponding graphic processor thread group one by one.

20. The non-transitory computer readable medium according to claim 16, further comprising instructions executable by a processor to perform a register division processing on the convolutions of corresponding data points in the plurality of data blocks and the plurality of filters.

* * * * *